United States Patent [19] — [11] 4,108,021
MacAfee et al. — [45] Aug. 22, 1978

[54] TRANSFER CASE

[75] Inventors: James Edwin MacAfee, Grosse Isle, Mich.; John W. Winkler; Karl Budde, both of Toledo, Ohio

[73] Assignee: Jeep Corporation, Detroit, Mich.

[21] Appl. No.: 790,109

[22] Filed: Apr. 22, 1977

Related U.S. Application Data

[63] Continuation of Ser. No. 642,099, Dec. 18, 1975, abandoned.

[51] Int. Cl.[2] .......................... F16H 57/02; F16H 1/38; F16H 1/40

[52] U.S. Cl. .......................... 74/606 R; 74/710; 74/713

[58] Field of Search .......................... 74/606 R, 710, 713

[56] References Cited

U.S. PATENT DOCUMENTS

| | | | |
|---|---|---|---|
| 3,610,055 | 10/1971 | Parris | 74/606 R X |
| 3,698,265 | 10/1972 | Williams | 74/606 R X |
| 3,783,710 | 1/1974 | Steinhagen | 74/606 R X |

*Primary Examiner*—Leonard H. Gerin

*Attorney, Agent, or Firm*—Reising, Ethington, Barnard, Perry & Brooks

[57] ABSTRACT

A transfer case for four wheel drive vehicles having a housing made up of two identical, complementary castings. The castings are secured together in opposed, complementary relationship to define a compartment for the mechanism for transmitting power to the front and rear axles of the vehicle. The castings are of identical construction to provide a compact housing and reduced manufacturing costs because of the interchangeability of the two castings making up the housing. The castings are formed to support a variety of transmission mechanisms. In one such arrangement disclosed, a dual range transmission is provided including parallel chain and gear train transmissions from the power shaft to the output shafts to the front and rear axles of the vehicle. The opposed end walls of the housing defined by the two complementary castings are formed with supporting structure for the power shaft from the engine, a counter shaft for the gear train transmission, and the output shafts for driving the front and rear axles.

21 Claims, 6 Drawing Figures

TRANSFER CASE

This is a continuation of application Ser. No. 642,099 filed Dec. 18, 1975, now abandoned.

BACKGROUND OF THE INVENTION

1. Field of the Invention

This invention relates generally to transfer cases for four wheel drive vehicles and is particularly concerned with the construction of a housing for such transfer cases to provide a compact, low cost transfer case utilizing a variety of mechanisms for transmitting power through the transfer case from the engine to the front and rear axles of a four wheel drive vehicle.

2. Description of the Prior Art

Transfer cases are employed in four wheel drive vehicles for transmitting power from the vehicle engine to the front and rear axles of the vehicle. In such vehicles, a significant amount of manufacturing cost and weight is involved in the transfer case. Furthermore, a large variety of transmission systems are required to fulfill different needs in four wheel drive vehicles. For example, some four wheel drive vehicles require only a single speed range while others require a dual speed range transmission within the transfer case. Some vehicles, both single and dual range, require full time four wheel drive while others require a transmission system that can be selectively shifted between two and four wheel drive.

In the manufacture of four wheel drive vehicles, a significant cost is involved in manufacturing separate parts to accommodate all of the variations in transmission systems required. There is a significant need for interchangeability of parts to reduce cost. Furthermore, there is a significant need to reduce the weight of all components of vehicles.

Examples of prior art transfer cases are disclosed in U.S. Pat. Nos. 2,331,908; 2,582,142; 2,971,595; 3,256,750; 3,283,298; 3,295,625; 3,505,904 and 3,605,523.

SUMMARY OF THE INVENTION

An object of this invention is to provide a transfer case having a low cost, light weight housing that can be employed as a housing for a variety of transfer case transmission systems without modification.

A further object of this invention is to provide a transfer case assembly including a low cost, light weight housing made up of complementary castings of identical construction that can be utilized interchangeably with transfer case assemblies employing different types of drive assemblies.

A further object is to provide a transfer assembly including a low cost, light weight housing with an input shaft for delivering power into the transfer case from the engine, and front and rear output shafts for connection with the front and rear axles of a four wheel drive vehicle, with transmission means extending between the input shaft and output shafts to transmit power therebetween.

In carrying out the foregoing, and other objects, a transfer case according to the present invention includes a housing made up of a pair of complementary castings of light weight material such as aluminum. The castings are of identical construction, each including an end wall and a continuous skirt portion projecting therefrom such that when the castings are disposed in opposed relationship, the edges of the skirt abut each other and a compartment is defined between the castings in the housing.

Each of the castings is formed with openings for supporting a power shaft, a counter shaft, and an output shaft to either the front or rear axle. In the disclosed embodiment, a dual range transmission is enclosed within the housing for transmitting power from the input or power shaft mounted in the power shaft openings to the output shafts mounted in the output shaft openings. The dual range transmission includes a high range chain drive transmission and a parallel low range gear train transmission.

The transmission assembly includes a differential gear for connecting the front and rear axle output shafts to provide for differential speeds between the front and rear axles. A differential lockout mechanism is provided for disabline the differential between the front and rear axle output shafts. The symmetrical construction of the castings making up the housing permits the housing to be employed with a variety of transmission systems from the power of input shaft to the output shafts.

Other objects, advantages and features of the invention will become apparent from the following description taken in connection with the accompanying drawings.

DESCRIPTION OF THE PREFERRED EMBODIMENT

Figure 1:
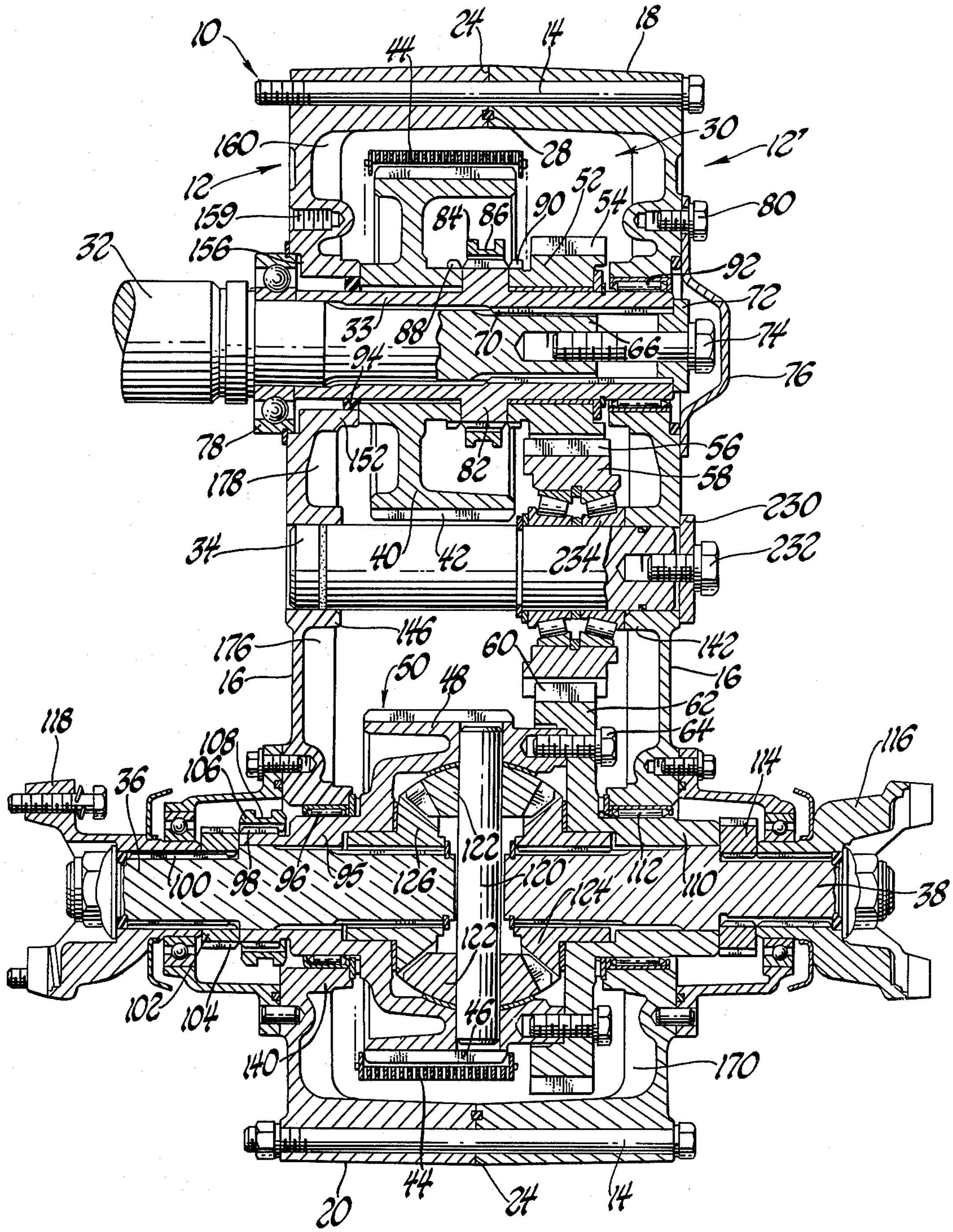
FIG. 1 is a cross sectional view of a transfer case assembly embodying the present invention.

The transfer case assembly illustrated in FIG. 1 includes a housing collectively designated by reference numeral 10. The housing 10 is made up of a pair of identical, complementary castings 12 and 12' of aluminum or other light weight metal. The castings 12 and 12' each form one half of the housing 10 and are joined together by bolts 14.

Figure 3:
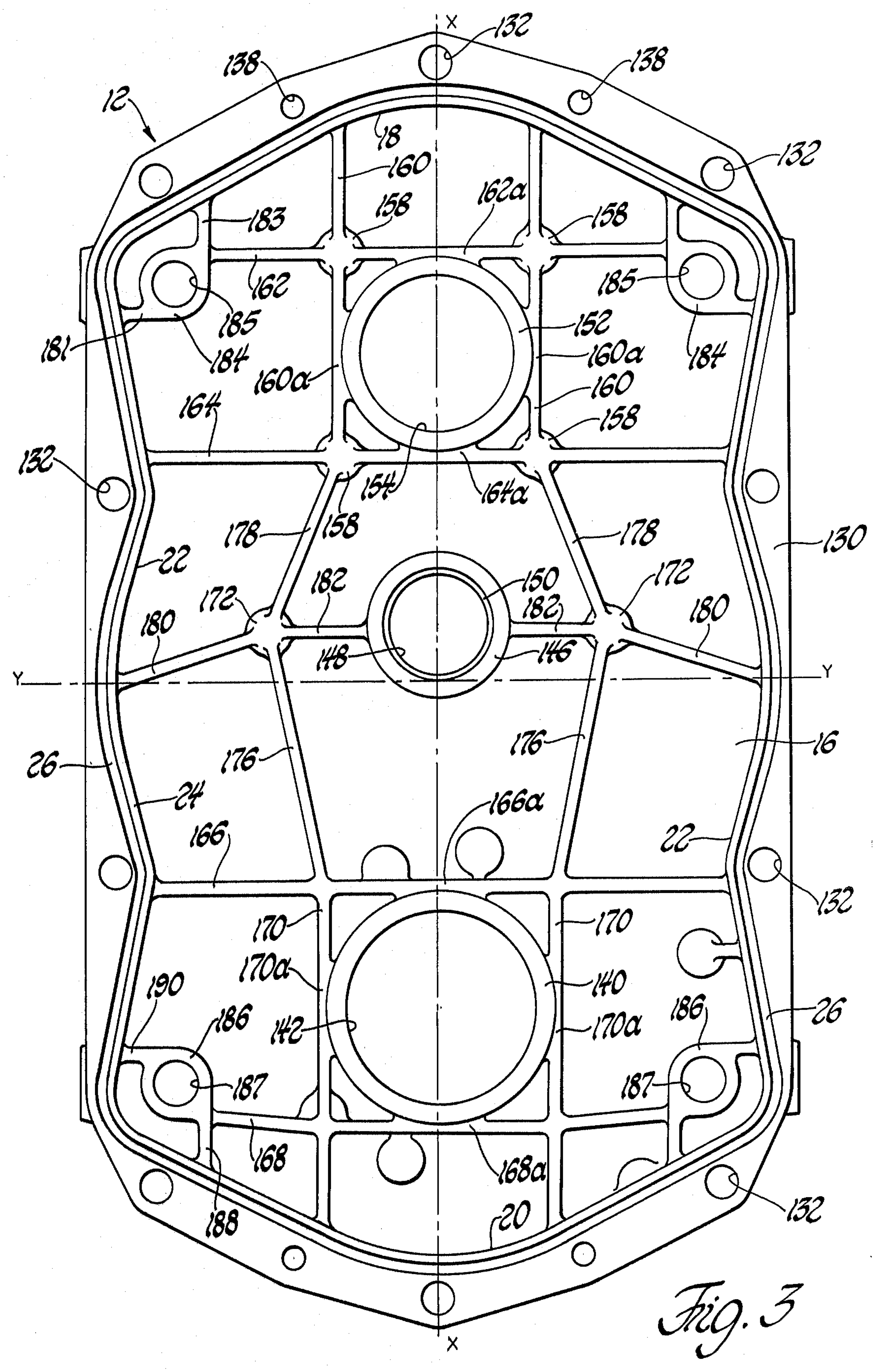
FIG. 3 is an elevational view showing the interior of the casting as viewed along lines 3—3 in FIG. 2.
Figure 4:
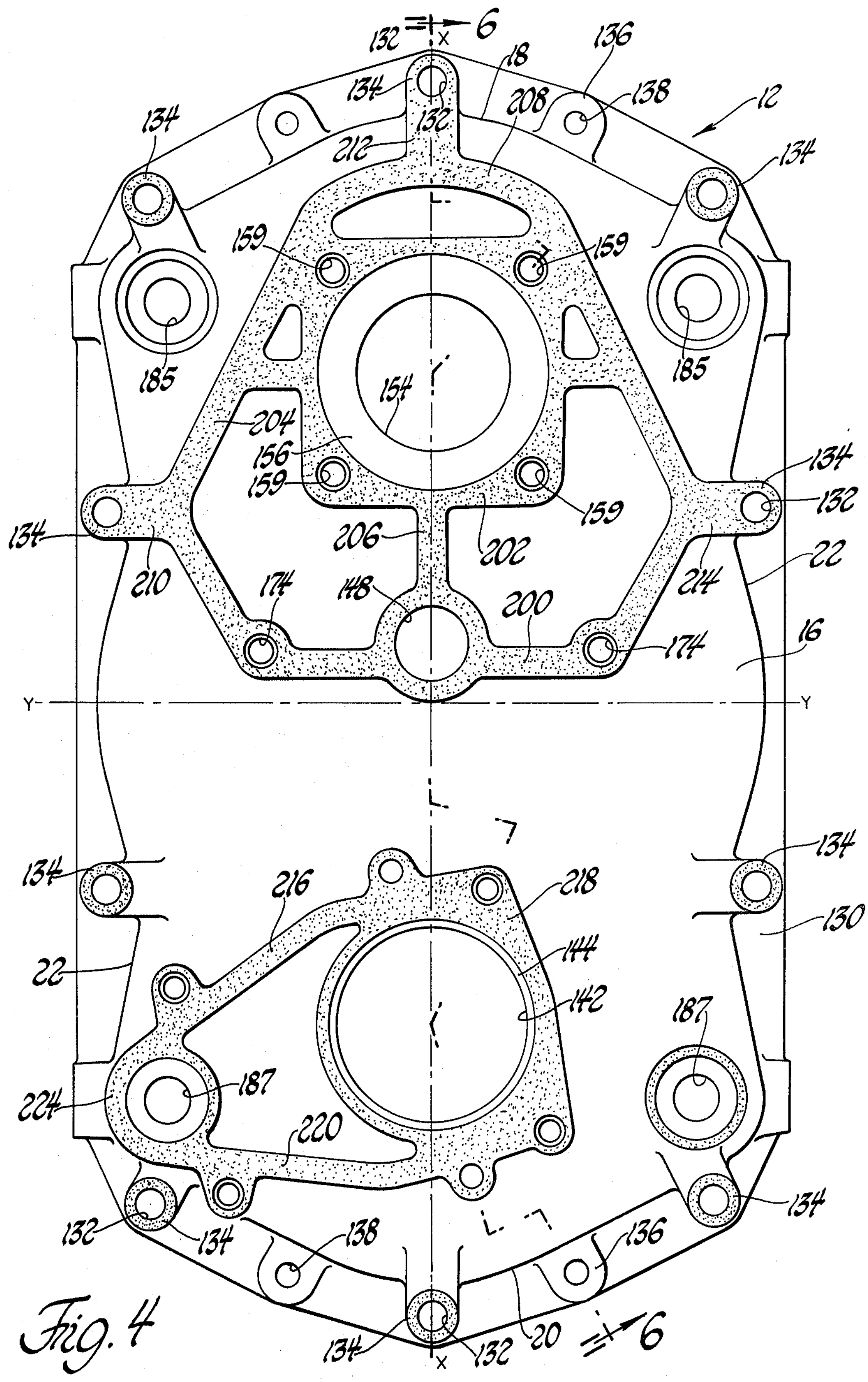
FIG. 4 is an elevational view showing the rear wall of the casting as viewed along lines 4—4 in FIG. 2.
Figure 2:
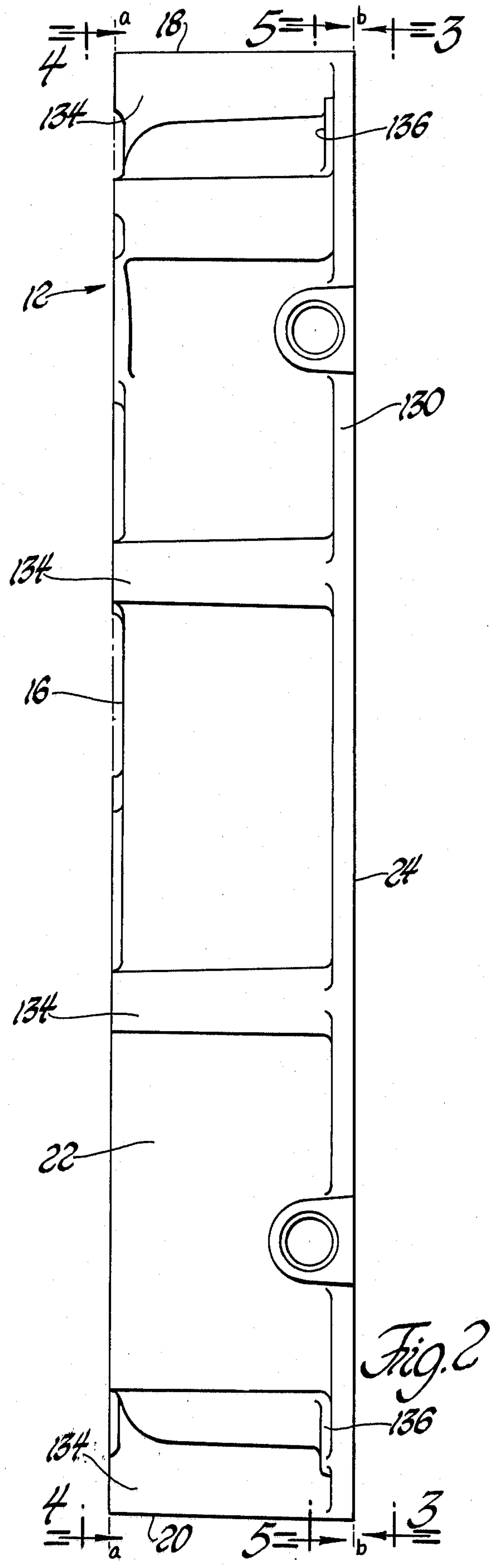
FIG. 2 is a side elevational view of one of the castings forming one half of the transfer case housing of the assembly of FIG. 1.
Figure 6:
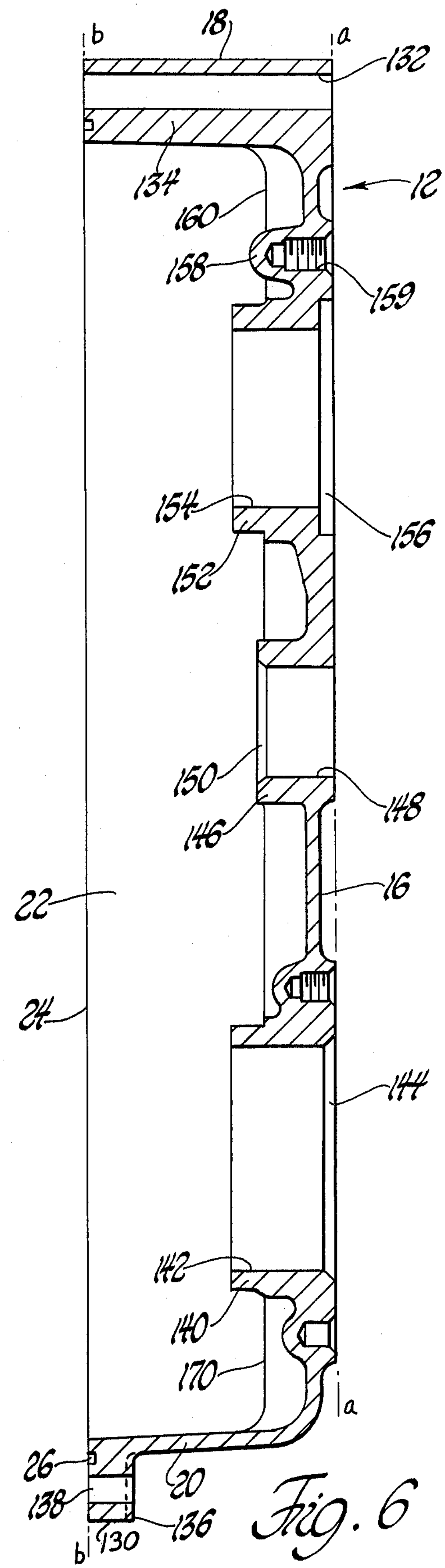
FIG. 6 is a sectional view, on the sheet with FIG. 2, taken on lines 6—6 of FIG. 3.

As shown in FIGS. 1, 2, 4 and 6, the castings 12 and 12' each includes an end wall 16 from which projects a continuous skirt having an endless peripheral edge 24 which serves as a mounting surface. The skirt includes an upper end portion 18, a lower end portion 20, and side portions 22 (FIG. 4). A groove 26 (FIG. 6) is formed in the peripheral edge portion 24 for receiving a sealing member 28 (FIG. 1). When the peripheral edge portions 24 abut each other as shown in FIG. 1, with the castings 12 and 12' bolted together, a compartment 30 is formed within the housing by the identical castings 12 and 12'. As illustrated in FIGS. 2 and 6, the end wall 16 of casting 12 includes outer surface portions (the stippled portions of FIG. 6) that lie in an outer end wall plane indicated at *a*—*a* in FIG. 2. The mounting surface 24 lies in a mounting surface plane *b*—*b* (FIG. 3) spaced from and parallel to the outer end wall plane *a*—*a*. The distance between the planes *a*—*a* and *b*—*b* in FIG. 2 defines the maximum dimension of the casting 12 in the direction normal to planes a—a and b—b of FIG. 2.

Mounted in the transfer case housing 10 is a hollow input shaft or sleeve 33, a counter shaft 34, and front and rear output shafts 36 and 38, respectively. The input sleeve 33 nonrotatably receives a power shaft 32 from the vehicle engine. In the illustrated embodiment of FIG. 1, power may be transmitted from the power shaft 32 to the output shafts 36 and 38 through either one of a high range chain drive connection or a low range gear train drive connection. The high range drive includes an input sprocket 40 rotatably mounted on the input sleeve 33. Sprocket 40 has external teeth 42 which are engaged by a chain 44. Chain 44 also engages the teeth 46 of a sprocket 48 forming part of a differential assembly indicated collectively by reference numeral 50.

The low range drive includes an input gear 52 rotatably mounted on the input shaft 33 and formed with external teeth 54. The teeth 54 of gear 52 are engaged with the teeth 56 of an idler gear 58 rotatably mounted on the counter shaft 34. Teeth 56 are also engaged with the teeth 60 of an output gear 62 which is secured by bolts 64 to the sprocket 48. Gear 62 and sprocket 48 form the box or housing of the differential assembly 50.

The power shaft 32 has a splined end portion 66 which is received in sleeve 33. The sleeve 33 has an internally splined portion 70 engaged with the splined portion 66 of shaft 32 to couple shaft 32 and sleeve 33 together. Shaft 32 is axially secured to sleeve 33 by a bolt 74 extending through a flanged cap 72 into threaded engagement with shaft 32. A bearing assembly 78 supports the opposite end of shaft 43, and the sleeve 33 is clamped between the inner race of the bearing assembly 78 and the cap 72. The cap 72 and bolt 74 are enclosed by a cover member 76 secured by bolts 80 to the end wall 16 of the casting 12'.

The input sprocket 40 and input gear 52 are both rotatably mounted on the sleeve 33. Formed on the sleeve 33 and projecting between the sprocket 40 and gear 52 is externally toothed power gear 83. Slidably mounted on gear 82 is an internally toothed clutch collar 84. Collar 84 is formed with an external groove 86 for engagement with a shifter fork (not shown). The collar 84 is illustrated in FIG. 1 in the neutral position in which neither the sprocket 40 nor gear 52 are coupled to the power shaft 32. Sprocket 40 is formed with drive teeth 88, and the input gear 52 is formed with drive teeth 90. When the collar 84 is shifted to the left in FIG. 1, the collar is in driving engagement with both the teeth of gear 82 and the drive teeth 88 to couple the sprocket 40 to be driven by the power shaft 32. Movement of the collar 84 to the right as viewed in FIG. 1 causes the collar 84 to engage both the teeth of gear 82 and the drive teeth 90 of gear 52 to couple sleeve 33 with gear 52 to cause the gear 52 to be driven by the input shaft 32.

The end of sleeve 33 opposite the bearing assembly 78 is supported on roller bearings 92. The end of sleeve 33 adjacent to the bearing assembly 78 is supported on a bushing 94.

The output sprocket 48 has a hub portion that is rotatably supported on the end wall 16 of casting 12 by bearings 96. The hub portion 95 rotatably receives the output shaft 36 and has external teeth 98 formed on its outer end. Shaft 36 is formed with splines 100. An internally splined lockout gear 102 is mounted on the splines 100 of shaft 36 to nonrotatably secure gear 102 to shaft 36. Gear 102 is formed with external teeth 104. A clutch collar 106 is slidably mounted on the teeth 98 and is formed with a shifter fork groove 108 for engagement with a shifter form (not shown). Movement of the clutch collar 106 to the left as viewed in FIG. 1 causes the collar 106 to engage both the teeth 98 and teeth 104 to couple the hub 95 of sprocket 98 to the lockout gear 102, which in turn causes power to be transmitted directly from the sprocket 48 through gear 102 to the shaft 36.

The output gear 62 has a hub 110 which is supported in the end wall 16 of casting 12' by bearings 112. Shaft 38 is rotatable with respect to the hub 110 and, like shaft 36, is splined at its outer end. An internally splined gear 114 is mounted on the splined end of shaft 38 between the end of hub 110 and a yoke member 116. Yoke member 116 is nonrotatably fixed to shaft 38 for transmitting power to the propeller shaft to the rear axle of the vehicle. A similar yoke 118 is nonrotatably secured to the spline end portion of the output shaft 36 for connection with the propeller shaft to the front axle.

A cross-pin 120 is mounted in the differential box formed by sprocket 48 and gear 62. Rotatably supported on the cross-pin 120 are differential pinions 122 which are meshed with beveled drive pinions 124 and 126 splined respectively to the ends of shafts 38 and 36.

When the collar 106 is in the position illustrated in FIG. 1, and the collar 84 is shifted to the left in FIG. 1 to couple sprocket 40 with the input shaft 33, the output shafts 36 and 38 are driven by chain 44 in the high speed range. In the illustrated embodiment, the sprockets 40 and 48 are the same size, that is, there is a one to one ratio between the power shaft 32 and output shafts 36 and 38 in the high range. When there is a change in the speed between the rear wheels and front wheels, the differential pinions 122 rotate about the cross-pin 120 in the conventional manner to drive the shafts 36 and 38 at different speeds. To defeat the differential action, the collar 106 is shifted to the left in FIG. 1 to couple teeth 98 and 104 together so that the sprocket 48 directly drives shaft 36.

When collar 84 is shifted to the right from the position shown in FIG. 1 to couple gear 52 with the input shaft 32, the output shafts 36 and 38 are driven in the low range through the gear train 52, 58 and 62. In the illustrated embodiment, the relative sizes of gears 52 and 62 are such that the speed of the input shaft 32 is twice that of the output shafts 34 and 36, that is, there is a two to one drive ratio in the low range between the input shaft 32 and output shafts 36 and 38.

With reference to FIGS. 3 through 6, the casting 12 is formed with a mounting flange 130 that projects outwardly from the skirt portions 18, 20 and 22. The inner face of flange 130 (the right hand face in FIG. 2) is in the same plane as the peripheral edge portion 24. The groove 26 is formed in the inner surface of flange 130 and may be considered to separate the inner face of flange 130 from the peripheral edge portion 24 of the skirt.

Figure 5:
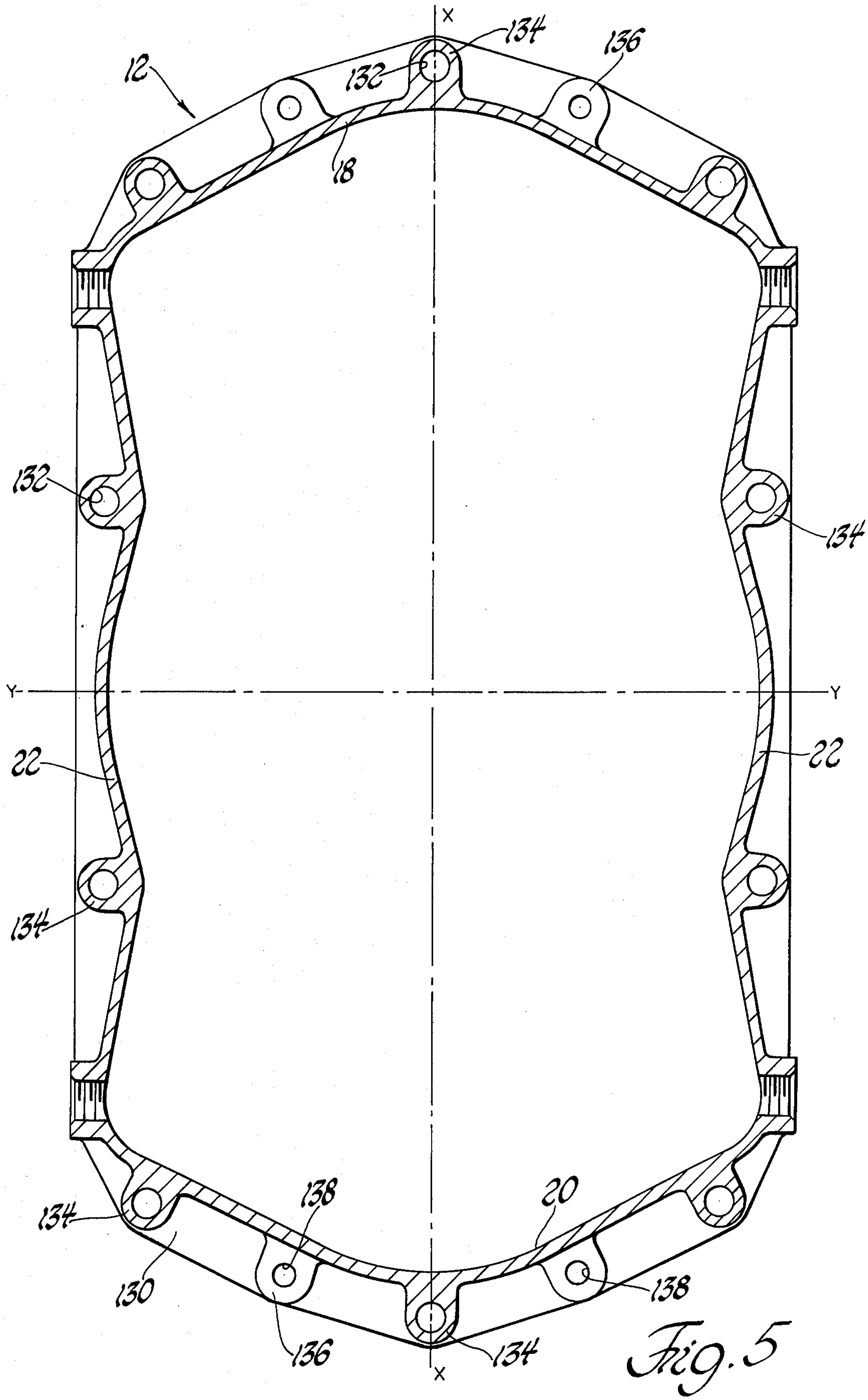
FIG. 5 is a sectional view taken on lines 5—5 of FIG. 2.

A vertical center line X—X, and a horizontal center line Y—Y are indicated in FIGS. 3, 4 and 5. A plurality of tubular mounting bosses 134, ten in the illustrated embodiment, are arranged symmetrically about the center lines X—X and Y—Y. Holes 132 extend through the mounting bosses 134 for receiving the bolts 14. Each of the mounting bosses 134 projects outwardly from the skirt and extends readwardly, or toward the left as viewed in FIG. 2, from the mounting flange 130 to the end wall 16.

A pair of pads 136 project outwardly from each of the skirt portions 18 and 20, each pair of pads 136 being located an equal distance on opposite sides of the vertical center line X—X. Dowel pin holes 138 are formed in the pads 136. When the castings 12 and 12' are secured together as illustrated in FIG. 1, dowel pins are pressed into the openings 138 to locate and align the castings precisely with respect to each other.

With reference to FIG. 6, a cylindrical boss 140 is formed on the end wall 116 and has an opening 142 for receiving one of the output shafts 36 and 38. The bearings 96 and 112 (FIG. 1) are received in the opening 142. Opening 142 is countersunk as indicated at 144 in FIG. 6 at its outer end.

A cylindrical boss 146 projects from the end wall near the horizontal center line Y—Y, and is formed with an opening 148 for receiving one end of the counter shaft 34. The inner end of opening 148 is countersunk as indicated at 150.

A cylindrical boss 152 projects from the end wall 16 in the upper portion thereof and is formed with an opening 154 for receiving the input sleeve 33. The outer end of opening 154 is surrounded by an enlarged recess 156 for receiving the bearing assembly 78 (FIG. 1).

With reference to FIGS. 3, 4 and 6, four fastener supporting projections are formed in the end wall 16, the projections 158 being spaced symmetrically about the center of opening 154. Tapped holes 159 are formed in the projections 158 (FIGS. 4 and 6) for receiving fasteners, such as fastener 80 in FIG. 1. A pair of transverse ribs 162 and 164 (FIG. 3) are located on opposite sides of boss 152, the ribs 162 and 164 being parallel to the horizontal center line Y—Y. Ribs 162 and 164 are intersected by a pair of longitudinal ribs 160 located on opposite sides of boss 152 and extending parallel to the vertical center line X—X. The projections 158 are each located at an intersection of the longitudinal ribs 160 with one of the transverse ribs 162 and 164.

Reference numerals 166 and 168 (FIG. 3) indicate lower transverse ribs located on opposite sides of boss 140. Ribs 166 and 168 are parallel to the horizontal center line Y—Y. A pair of longitudinal ribs 170, each of which is parallel to the vertical center line X—X, are located on opposite sides of boss 140 and each intersects the transverse ribs 166 and 168.

In FIG. 3, reference numeral 172 indicates a fastener supporting projections located in the midportion of the end wall 16 that is defined between the transverse ribs 164 and 166. Tapped holes 174 (FIG. 4) are formed in the projections 172 for receiving threaded fasteners. A pair of ribs 176 extend upwardly and outwardly on opposite sides of the vertical center line X—X from the junction of ribs 166 and 170 to the projections 172. A pair of upwardly and inwardly extending ribs 178 (as viewed in FIG. 3) extend between projections 172 and 158 on opposite sides of the vertical center line X—X. Reference numeral 180 indicates ribs that extend outwardly and downwardly (as viewed in FIG. 3) from projections 172 to the inner surface of the side skirt portion 22. Transverse ribs 182 extend from the boss 146 to each of the projections 172 on opposite sides of the center line of the boss 146 and parallel to a diameter of boss 146.

Openings 185 are formed in bosses 184 located at the upper left and right hand corners (as viewed in FIG. 3) of the casting 12 on opposite sides of the vertical center line X—X. A leg or reinforcing rib 181 extends from the boss 184 to the inner surface of the side skirt portion 22, and a leg or rib 183 extends from the boss 184 to the inner surface of the upper end portion 18 of the skirt. Openings 185 may be provided for slidably receiving shift rail members or the like. Similarly, bosses 186 are located in the lower corners as viewed in FIG. 3 having openings 187 formed therein. Legs 188 and 190 extend from the bosses 186 to the inner surface of the lower skirt portion 20 and the side skirt portion 22, respectively.

The rib formation on the inner surface of the end wall 16 as viewed in FIG. 3 provides maximum strength and a minimum amount of material, and hence weight, in the areas of the housing subjected to high stress. The upper transverse rib 162 on the side of the input shaft boss 152 adjacent to the upper end portion 18 of the skirt is integrally connected with the input shaft boss 152 as indicated at **162*a*. Similarly, the upper transverse rib 164 located on the diametrically opposite side of the boss 152 from rib 162 is integrally connected at 164*a* with the boss 152. The upper longitudinal ribs 160 are likewise integrally connected with boss 152 on diametrically opposite sides thereof as indicated at 160*a***.

Similarly, the lower transverse rib 168 located on the side of the output shaft boss 140 adjacent to the lower end portion of the skirt is integrally connected with boss 140 as indicated at **168*a*. Rib 166 is integrally connected with boss 140 as indicated at 166*a*, and the lower longitudinal ribs 170 are integrally connected to diametrically opposite sides of boss 140 as indicated at 170*a***.

The vertical and horizontal center lines X—X and Y—Y are imaginary lines for reference purposes only. With reference to FIG. 3, the area between the transverse ribs 164 and 166 may be considered to be the midportion of the casting, and in the illustrated embodiment, the counter shaft boss 146 is offset upwardly from the imaginary horizontal center line Y—Y. The side skirt portions 22 are bowed outwardly at the midportion which inherently provides additional strength against external impact forces. Similarly, the upper and lower portions 18 and 20 of the skirt are bowed or curved outwardly from the corners to their intersection with the imaginary vertical center line X—X.

The side portions 22 of the skirt extend outwardly from the transverse ribs 164 and 166 to their junctions with the ends of the respective upper and lower end portions 13 and 20. The corners defined at the junction between the side portions and end portions are reinforced by the legs 181 and 183 extending tangentially at right angles to each other from the bosses 184.

The network of reinforcing ribs 176, 178, 180 and 182 in the midportion of the casting between the transverse ribs 164 and 166 provides maximum strength and minimum material, and hence weight, in the midportion of the casting which is subject primarily to stress exerted by forces on the counter shaft 34.

With reference to FIG. 4, additional strength is provided to the end wall of the casting by thickened or raised portions 200, 202, 204, 206, 208, 210, 212 and 214 interconnecting the input shaft boss, counter shaft boss and three of the mounting bosses, one of which is located at the apex of the upper end of the casting on the vertical center line X—X, and the other two of which are adjacent to the raised portions 210 and 214 on opposite sides of the vertical center line. Similarly, raised or thickened portions 216, 218, 220 and 224 interconnect the output shaft boss with the lower left hand corner boss 186 as viewed in FIG. 4. The portion 224 constitutes a side portion which is spaced from the portion 218 surrounding the output shaft boss, and portions 216 and 220 constitute a pair of interconnecting portions connecting the side portion 224 with portion 218.

When a pair of the identical castings are secured together in opposed, complementary relationship as shown in FIG. 1, the input shaft bosses 152 are in coaxial relationship with each other as is the case with the counter shaft bosses 146 and output shaft bosses 140. A high strength housing for the transfer case is thus provided having great versatility; a variety of transmission systems can be enclosed within the transfer case housing in addition to the specific, dual range transmission system illustrated in FIG. 1. An efficient arrangement of transmissions systems is made possible by the construction of the housing, and significant reduction in the amount of materials, manufacturing and assembling problems results from the adaptability of the housing for a variety of transmission systems. The location of the bosses for supporting the shafts lends itself to efficient transmission designs which are interchangeable within the transfer case housing.

For example, in the illustrated embodiment, a dual range transmission is provided having parallel chain and gear train drives from the input shaft to the output shafts. For vehicles not requiring a dual range transmission, the gear train transmission can be omitted and a single range chain drive transmission can be enclosed within the same housing. Conversely, simply by installation of the counter shaft 34 and the input and output gears 52 and 62, the same transfer case housing can be utilized for a dual range transmission. The counter shaft 34 is secured in position, as illustrated in FIG. 1, by a cap member 230 secured in position by a bolt 232 threadedly engaged with the counter shaft 34. The counter shaft 34 is secured in position against axial displacement by the engagement of the inner race 234 with boss 146 such that the boss 146 is clamped between the cap 230 and bearing race 234.

In the operation of the disclosed transmission, when the coupling member 84 is shifted to the high range position to couple sprocket 40 with the input shafts 33, power is transmitted to the output shafts 36 and 38 by the chain 44. When the load on the output shafts 36 and 38 is the same, the differential pinions 122 drive the gears 124 and 126 at the same speeds, assuming the coupling member 106 to be in the position shown in FIG. 1. If there is a difference in the load between the output shafts 36 and 38, the differential pinions 122 will rotate about the cross pin 122 to drive the output shafts 36 and 38 at different speeds. The differential action can be defeated by shifting the coupling member 106 to the left in FIG. 1 to couple sprocket 48 with the output shaft 36 through the lockout gear 102. The low range operation is the same except that the coupling member 184 is shifted to the right from the position shown in FIG. 1 to couple the input gear 52 with the input shaft 33.

While a specific form of the invention is described in the foregoing specification and illustrated in the accompanying drawings, it should be understood that the invention is not limited to the exact construction shown. To the contrary, various alterations in the construction and arrangement of parts, all falling within the scope and spirit of the invention, will be apparent to those skilled in the art.

The embodiments of the present invention in which an exclusive property or privilege is claimed are defined as follows:

1. A transfer case comprising: a housing, said housing being made up of a pair of identical castings; each of said castings having an end wall, an endless skirt projecting from said end wall, and a mounting flange projecting outwardly from the end of said skirt remote from said end wall; said pair of castings being disposed in opposed relationship with a mounting flange of one of said castings secured to the mounting flange of the other of said castings, said castings cooperating to define a compartment within said housing; an input shaft rotatably mounted in the end wall of each of said castings; a pair of output shafts, one of said output shafts being rotatably supported in the end wall of one of said castings and the other of said output shafts being rotatably supported in the end wall of the other of said castings, said output shafts projecting from said housing in opposite directions; and power transmitting means connecting said input shaft with said output shafts for transmitting power from said input shaft to said output shafts.

2. A transfer case assembly as claimed in claim 1 wherein the skirt of each casting includes an upper end portion, a lower end portion, and a pair of spaced side portions extending between said upper and lower end portions; the vertical center line of each casting extending between said end portions and the horizontal center line of said castings extending between said side portions; and further including a plurality of tubular mounting bosses projecting outwardly from the skirt and extending between said end wall and mounting flange, said mounting bosses being arranged symmetrically about said vertical and horizontal center line; and a bolt extending through the opposed mounting bosses of said pair of castings to secure said pair of castings together.

3. A transfer case assembly as claimed in claim 2 wherein each of said castings is formed with a cylindrical output shaft boss projecting inwardly from the end wall of the respective casting, each of said output bosses supporting one of said output shafts; each of said castings being formed with a cylindrical input shaft boss projecting inwardly from the end wall of the respective casting, said input shaft being supported on said input shaft bosses.

4. A transfer case assembly as claimed in claim 3 wherein each of said castings includes a cylindrical counter shaft boss projecting inwardly from the end wall of the respective casting between the input shaft boss and output shaft boss thereof; said transmission means including a counter shaft mounted in said counter shaft bosses.

5. A transfer case assembly as claimed in claim 4 wherein each of said castings includes a pair of upper transverse ribs located on opposite sides of said input shaft boss, said upper transverse ribs being parallel with said horizontal center line and connected with said input shaft boss; a pair of upper longitudinal ribs located on opposite sides of said input shaft boss and extending parallel to said vertical center line; a pair of lower transverse ribs located on opposites sides of said output shaft boss and extending parallel to said horizontal center line; and a pair of lower longitudinal ribs located on opposite sides of said output shaft boss and extending parallel to said horizontal center line.

6. A transfer case assembly as claimed in claim 5 wherein each of said castings includes a pair of transverse ribs extending from opposite sides of said counter shaft boss in parallel relationship with said horizontal center line; a rib extending outwardly and downwardly from the end of each said last named transverse ribs to the adjacent side portion of said skirt; a pair of ribs extending upwardly and outwardly on opposite sides of said vertical center line from one of said lower transverse ribs to the junction of said downwardly and outwardly extending ribs with said last named transverse ribs; and a pair of upwardly and inwardly extending ribs extending from each of said last named junctions to one of said upper transverse ribs at the junction thereof with said upper longitudinal ribs.

7. A transfer case assembly as claimed in claim 6 further including a plurality of fasteners supporting projections projecting from the inner surface of the end wall of each of said castings, each of said fasteners supporting projections being located at a junction between said ribs.

8. A transfer case assembly as claimed in claim 7 wherein each of said castings includes four corner bosses located at each junction between the side and end portions of said skirt; an opening formed in each of said corner bosses; a leg extending from each of said corner boss to the inner surface of the adjacent end portion of the skirt; and a leg extending from each corner boss to the inner surface of the adjacent side portion of said skirt.

9. A transfer case housing comprising: a pair of identical castings; each of said castings having an end wall, an endless skirt projecting from said end wall, and a mounting flange projecting outwardly from the end of said skirt remote from said end wall; said pair of castings being disposed in opposed relationship with the mounting flange of one of said castings secured to and abutting the mounting flange of the other of said castings, said castings cooperating to define a compartment within said housing; the skirt of each of said castings including an upper end portion, a lower end portion, and a pair of spaced side portions extending between said upper and lower end portions; an imaginary vertical center line of each casting extending between said end portions and an imaginary horizontal center line of said castings extending between said side portion; each of said castings including a plurality of tubular mounting bosses projecting outwardly from the skirt thereof and extending between the end wall and mounting flange thereof, said mounting bosses being arranged symmetrically about said vertical and horizontal center lines; and a bolt extending through the opposed mounting bosses of said pair of castings to secure said pair of castings together to form said housing.

10. A transfer case housing as claimed in claim 9 wherein each of said castings is formed with a cylindrical output shaft boss projecting inwardly from the end wall of the respective casting near the lower end portion of said skirt, said output bosses being in coaxial relationship with each other when said castings are secured together in opposed, complementary relationship to form said housing; each of said castings being formed with a cylindrical input shaft boss projecting inwardly from the end wall of the respective casting near the upper end portion of said skirt, said input shaft bosses being disposed in coaxial relationship with each other when said castings are secured together in opposed, complementary relationship to define said housing.

11. A transfer case housing as claimed in claim 10 wherein each of said castings includes a pair of upper transverse ribs formed on the inner surface of said end wall and extending parallel to said imaginary horizontal center line, one of said pair of upper transverse ribs being located on the side of said input shaft boss adjacent said upper end portion and the other of said upper transverse ribs being located on the diametrically opposite side of said input shaft boss, both of said upper transverse ribs being integrally connected with said input shaft boss; and a pair of upper longitudinal ribs formed on the inner surface of said end wall and extending parallel to said imaginary vertical center line, each of said upper longitudinal ribs being located on diametrically opposite sides of said input shaft boss with one end joined to said other upper transverse rib and its other end joined to the inner surface of the upper end portion of said skirt, each of said longitudinal ribs intersecting and being integral with said one of said upper transverse ribs.

12. A transfer case housing as claimed in claim 11 wherein each of said castings has a pair of lower transverse ribs formed on the inner surface of the end wall thereof and extending parallel to said imaginary horizontal center line; one of said lower transverse ribs being located on the side of said output shaft boss adjacent to said lower end portion of said skirt and the other of said lower transverse ribs being located on the diametrically opposite side of said output shaft boss, both of said transverse ribs being integrally connected with said output shaft boss.

13. A transfer case housing as claimed in claim 12 wherein each of said castings has a pair of lower longitudinal ribs formed on the inner surface of said end wall and extending parallel to said imaginary vertical center line, each of said lower longitudinal ribs being located on diametrically opposite sides of said output shaft boss with one end joined to said other of said lower transverse ribs and its other end joined to the inner surface of the lower end portion of said skirt, each of said lower longitudinal ribs intersecting and being integrally connected with said one of said lower transverse ribs.

14. A transfer case housing comprising: a pair of complementary castings; each of said castings having an end wall with outer surface portions lying in an outer end wall plane, an endless skirt projecting from said end wall, said skirt having an inner end joined integrally to the periphery of said end wall and an outer free end with an endless mounting surface formed thereon and lying in a mounting surface plane spaced from and parallel to the outer end wall plane with the distance between the outer end wall plane and mounting surface plane defining the maximum dimension of the casting in the direction normal to said planes, said skirt projecting from said outer free end toward said inner end at substantially a right angle with respect to said planes, said skirt of each casting including an upper outwardly bowed end portion, a lower outwardly bowed end portion, and a pair of spaced side portions extending between said upper and lower end portions; the imaginary vertical center line of each of said castings extending between said end portions and the imaginary horizontal center line of each of said castings extending between said side portions; a plurality of tubular mounting bosses formed on the skirt of each casting with one end thereof located at said mounting surface and extending from said one end toward the end wall of its respective casting; said mounting bosses being arranged substantially symmetrically about said vertical and horizontal center lines; a bolt extending through each opposed pairs of the mounting bosses of said pair of castings to secure said pair of castings together in opposed relationship with the mounting surface of one of said castings abutting the mounting surface of the other of said castings; each of said castings being formed with a cylindrical input shaft boss projecting inwardly from the end wall of the respective casting with the input shaft bosses being in coaxial relationship for supporting input shaft means; and each of said castings being formed with a cylindrical output boss projecting inwardly from the end wall of the respective casting with the output shaft bosses being in coaxial relationship for supporting output shaft means; said castings cooperating to define a compartment for power transmitting means within said housing.

15. A transfer case housing as claimed in claim 14 wherein each of said castings is formed with integral reinforcing means to strengthen the casting particularly in the direction normal to the outer end wall planes of the castings.

16. A transfer case housing as claimed in claim 15 wherein said reinforcing means includes a plurality of ribs formed on the end wall of each casting.

17. A transfer case housing as claimed in claim 16 wherein said plurality of ribs for each casting includes a pair of upper transverse ribs formed on the inner surface of the respective end wall and extending parallel to said imaginary horizontal center line, one of said pair of upper transverse ribs being located on the side of said input shaft boss adjacent said upper end portion and the other of said upper transverse ribs being located on the diametrically opposite side of said input shaft boss, both of said upper transverse ribs being integrally connected with said input shaft boss; and a pair of upper longitudinal ribs formed on the inner surface of said end wall and extending parallel to said imaginary vertical center line, each of said upper longitudinal ribs being located on diametrically opposite sides of said input shaft boss with one end joined to said other upper transverse rib and its other end joined to the inner surface of the upper end portion of said skirt, each of said longitudinal ribs intersecting and being integral with said one of said upper transverse ribs; a pair of lower transverse ribs formed on the inner surface of the end wall thereof and extending parallel to said imaginary horizontal center line; one of said lower transverse ribs being located on the side of said output shaft boss adjacent to said lower end portion of said skirt and the other of said lower transverse ribs being located on the diametrically opposite side of said output shaft boss, both of said transverse ribs being integrally connected with said output shaft boss; and a pair of lower longitudinal ribs formed on the inner surface of said end wall and extending parallel to said imaginary vertical center line, each of said lower longitudinal ribs being located on diametrically opposite sides of said output shaft boss with one end joined to said other of said lower transverse ribs and its other end joined to the inner surface of the lower end portion of said skirt, each of said lower longitudinal ribs intersecting and being integrally connected with said one of said lower transverse ribs.

18. A casting for a transfer case housing comprising: an integral body having an end wall with outer surface portions lying in an outer end wall plane; an endless skirt projecting from said end wall, said skirt having an inner end joined integrally to the periphery of said end wall and an outer free end with an endless mounting surface formed thereon and lying in a mounting surface plane spaced from and parallel to the outer end wall plane with the distance between the outer end wall plane and mounting surface plane defining the maximum dimension of the casting in the direction normal to said planes; said skirt projecting from said outer free end toward said inner end at substantially a right angle with respect to said planes; said skirt including an upper outwardly bowed end portion, a lower outwardly bowed end portion, and a pair of spaced side portions extending between said upper and lower end portions; the imaginary vertical center line of said casting extending between said end portions and the imaginary horizontal center line of said casting extending between said side portions; a plurality of tubular mounting bosses formed on the skirt of said casting with one end thereof located at said mounting surface and extending from said one end toward the end wall of said casting, said mounting bosses being arranged substantially symmetrically about said vertical and horizontal center lines; a cylindrical input shaft boss projecting from said end wall on one side of said horizontal center line with its center located on said vertical center line; a cylindrical output shaft boss projecting from said end wall on the opposite side of said horizontal center line from said input shaft boss; a counter shaft boss projecting from said end wall between said input shaft boss and said output shaft boss with its center located on said vertical center line; and said end wall being formed with reinforcement means to strengthen the casting particularly in the direction normal to the outer end wall plane.

19. A casting as claimed in claim 18 wherein said reinforcement means comprises raised portions projecting integrally from the outer surface of said end wall, said raised portions including portions surrounding said input shaft boss, counter shaft boss, a mounting boss at the upper end of said casting on said vertical center line, a pair of mounting bosses located on opposite sides of said vertical center line and between said input shaft boss and counter shaft boss, and interconnecting portions extending between the portion surrounding said input shaft boss and the portion surrounding said counter shaft boss, and between the portions surrounding said input and counter shaft bosses and said last named mounting bosses.

20. A casting as claimed in claim 19 wherein said raised portions further include a portion surrounding said output shaft boss, a side portion spaced from said output shaft boss, and a pair of interconnecting portions connecting said side portion and the portion surrounding said output shaft boss.

21. A casting as claimed in claim 20 wherein said reinforcement means comprises: a pair of upper transverse ribs formed on the inner surface of said end wall and extending parallel to said imaginary horizontal center line, one of said pair of upper transverse ribs being located on the side of said input shaft boss adjacent said upper end portion and the other of said upper transverse ribs being located on the diametrically opposite side of said input shaft boss, both of said upper transverse ribs being integrally connected with said input shaft boss; a pair of upper longitudinal ribs formed on the inner surface of said end wall and extending parallel to said imaginary vertical center line, each of said upper longitudinal ribs being located on diametrically opposite sides of said input shaft boss and being integrally connected with said input shaft boss, each of said upper longitudinal ribs having one end joined to said other upper transverse rib and its other end joined to the inner surface of the upper end portion of said skirt, each of said longitudinal ribs intersecting and being integrally connected with said one of said upper transverse ribs; a pair of lower transverse ribs formed on the inner surface of said end wall and extending parallel to said imaginary horizontal center line, one of said lower transverse ribs being located on the side of said output shaft boss adjacent to said lower end portion of said skirt and the other of said lower transverse ribs being located on the diametrically opposite side of said output shaft boss with both of said lower transverse ribs being integrally connected with said output shaft boss; a pair of lower longitudinal ribs formed on the inner surface of said end wall and extending parallel to said imaginary vertical center line, each of said lower longitudinal ribs being located on diametrically opposite sides of said output shaft boss with one end joined to said other lower transverse rib and its other end joined to the inner surface of the lower end portion of said skirt, each of said lower longitudinal ribs intersecting and being integrally connected with said one of said lower transverse ribs and being integrally connected with said output shaft boss; a pair of transverse ribs formed on the inner surface of said end wall and extending from opposite sides of said counter shaft boss in parallel relationship with said imaginary horizontal center line; a rib extending outwardly and downwardly from the end of each of said last named transverse ribs to the adjacent side portion of said skirt; a pair of ribs extending upwardly and outwardly on opposite sides of said imaginary vertical centerline from said other lower transverse rib to the junction of said downwardly and outwardly extending ribs with said last named transverse ribs; and a pair of upwardly and inwardly extending ribs extending from each of said last named junctions to said other of said upper transverse ribs at the junction thereof with said upper longitudinal ribs.

* * * * *